(12) United States Patent
Mastrocola

(10) Patent No.: US 10,962,014 B2
(45) Date of Patent: Mar. 30, 2021

(54) VALVE-LESS VARIABLE DISPLACEMENT PUMP

(71) Applicant: Hamilton Sundstrand Corporation, Charlotte, NC (US)

(72) Inventor: Naison E. Mastrocola, Goshen, CT (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 343 days.

(21) Appl. No.: 15/875,103

(22) Filed: Jan. 19, 2018

(65) Prior Publication Data

US 2019/0226484 A1    Jul. 25, 2019

(51) Int. Cl.
| | |
|---|---|
| F04D 13/06 | (2006.01) |
| F04B 7/06 | (2006.01) |
| F04B 17/03 | (2006.01) |
| F04B 17/04 | (2006.01) |
| H02K 33/16 | (2006.01) |

(52) U.S. Cl.
CPC .............. F04D 13/062 (2013.01); F04B 7/06 (2013.01); F04B 17/03 (2013.01); F04B 17/046 (2013.01); H02K 33/16 (2013.01)

(58) Field of Classification Search
CPC .. F04D 13/062; H02K 33/16; H02K 2201/18; H02K 33/12; H02K 33/14; H02K 41/02; F04B 17/046; F04B 17/03; F04B 7/06; F04B 7/04; F04B 17/04; F04B 35/045; F04B 39/0005; F04B 53/148; F04B 17/042; F04B 23/06; F04B 5/02
USPC .............. 417/417, 490, 500, 509; 310/12.14
See application file for complete search history.

(56) References Cited

U.S. PATENT DOCUMENTS

| | | | |
|---|---|---|---|
| 1,034,592 A | 8/1912 | Dourte | |
| 3,602,614 A | 8/1971 | Zelle et al. | |
| 4,008,003 A * | 2/1977 | Pinkerton | F04B 5/02 417/250 |
| 5,924,975 A * | 7/1999 | Goldowsky | F04B 17/046 600/16 |
| 5,961,303 A * | 10/1999 | King | F04B 7/06 417/492 |
| 6,290,640 B1 * | 9/2001 | Goldowsky | F04B 17/046 600/16 |
| 6,558,127 B2 * | 5/2003 | Maruyama | F04B 7/06 222/333 |
| 7,798,783 B2 * | 9/2010 | Burns | F04B 7/06 417/53 |

(Continued)

FOREIGN PATENT DOCUMENTS

CN    1707925 A    12/2005

OTHER PUBLICATIONS

European Office Action for EP Application No. 19152606.0 dated Apr. 17, 2020, pp. 1-5.

(Continued)

*Primary Examiner* — Dominick L Plakkoottam
(74) *Attorney, Agent, or Firm* — Cantor Colburn LLP

(57) ABSTRACT

A pump assembly is provided. The pump assembly includes a stator assembly and a piston assembly. The stator assembly includes a rotary winding and a linear winding. The piston assembly is positioned within the stator assembly. The piston assembly translates along a lengthwise axis of the stator assembly and rotates about the lengthwise axis of the stator assembly to create a pumping action.

16 Claims, 6 Drawing Sheets

(56) References Cited

U.S. PATENT DOCUMENTS

| | | | |
|---|---|---|---|
| 9,004,883 B2* | 4/2015 | Neelakantan | F04B 11/0058 417/417 |
| 2001/0043016 A1* | 11/2001 | Chun | H02K 21/14 310/12.14 |
| 2001/0043864 A1* | 11/2001 | Maruyama | F04B 7/06 417/44.1 |
| 2003/0156948 A1* | 8/2003 | Malmquist | B64C 13/50 417/111 |
| 2007/0237658 A1* | 10/2007 | Burns | F04B 7/06 417/417 |
| 2008/0028758 A1* | 2/2008 | Teng | B29C 45/5008 60/369 |
| 2016/0160854 A1 | 6/2016 | Dehan et al. | |
| 2018/0179918 A1* | 6/2018 | Gusev | F01B 11/007 |

OTHER PUBLICATIONS

European Search Report for European Application No. 19152606.0 dated Mar. 22, 2019; 8 Pages.

* cited by examiner

VALVE-LESS VARIABLE DISPLACEMENT PUMP

BACKGROUND

Typical pumping systems for engine injection applications require a motor mounted to a conventional pump that is not weight optimal. Failure modes of these conventional pumps are dominated by moving components, e.g., bearings that wear out, valves that clog/leak, etc., that if eliminated would significantly increase reliability. Thus, what is needed is a highly accurate, reliable, and compact variable displacement pumping system.

BRIEF DESCRIPTION

In accordance with one or more embodiments, a pump assembly is provided. The pump assembly including a stator assembly. The stator assembly including a rotary winding and a linear winding. The pump assembly including a piston assembly positioned within the stator assembly. The piston assembly translates along a lengthwise axis of the stator assembly and rotates about the lengthwise axis of the stator assembly to create a pumping action.

In accordance with one or more embodiments or the above pump assembly embodiment, the piston assembly can include a linear armature and a rotary armature.

In accordance with one or more embodiments or any of the above pump assembly embodiments, the stator assembly can act as a piston cylinder within which the piston assembly translates in accordance with the linear winding interacting with the linear armature and rotates in accordance with the rotary winding interacting with the rotary armature to create the pumping action.

In accordance with one or more embodiments or any of the above pump assembly embodiments, the stator assembly can include a plurality of stator ports, the plurality of stator ports including an inlet stator port and an outlet stator port.

In accordance with one or more embodiments or any of the above pump assembly embodiments, the pumping action can pump a working fluid from the inlet stator port to the outlet stator port as the piston assembly translates and rotates within the stator assembly.

In accordance with one or more embodiments or any of the above pump assembly embodiments, the piston assembly can include a plurality of piston ports and an inner fluid vane, the plurality of piston ports including a pressure port and a piston port connected by the inner fluid vane.

In accordance with one or more embodiments or any of the above pump assembly embodiments, the plurality of piston ports can include a second pressure port connected to the piston port by the inner fluid vane.

In accordance with one or more embodiments or any of the above pump assembly embodiments, the piston assembly can include a second inner fluid vane, the plurality of piston ports including a second pressure port and a second piston port connected by the second inner fluid vane.

In accordance with one or more embodiments or any of the above pump assembly embodiments, the pump assembly can be electrically coupled to a controller, and the pump assembly can receive a waveform that drives the rotary winding and the linear winding.

In accordance with one or more embodiments or any of the above pump assembly embodiments, an amplitude of the waveform can drive the translation of the piston assembly.

In accordance with one or more embodiments or any of the above pump assembly embodiments, a frequency of the waveform can drive the rotation of the piston assembly.

In accordance with one or more embodiments, the pumping system is provided. The pumping system includes a pump assembly. The pump assembly includes a stator assembly and a piston assembly. The stator assembly includes a rotary winding and a linear winding. The piston assembly is positioned within the stator assembly. The pumping system includes a controller electrically coupled to the pump assembly. The controller provides a waveform that drives the rotary winding and the linear winding.

In accordance with one or more embodiments or the above pumping system embodiment, the piston assembly can translate along a lengthwise axis of the stator assembly and can rotate about the lengthwise axis of the stator assembly to create a pumping action.

In accordance with one or more embodiments or any of the above pumping system embodiments, the piston assembly can include a linear armature and a rotary armature.

In accordance with one or more embodiments or any of the above pumping system embodiments, the stator assembly can act as a piston cylinder within which the piston assembly translates in accordance with the linear winding interacting with the linear armature and rotates in accordance with the rotary winding interacting with the rotary armature to create the pumping action.

In accordance with one or more embodiments or any of the above pumping system embodiments, the stator assembly can include a plurality of stator ports, the plurality of stator ports including an inlet stator port and an outlet stator port.

In accordance with one or more embodiments or any of the above pumping system embodiments, the pumping action can pump a working fluid from the inlet stator port to the outlet stator port as the piston assembly translates and rotates within the stator assembly.

In accordance with one or more embodiments or any of the above pumping system embodiments, the piston assembly can include a plurality of piston ports and an inner fluid vane, the plurality of piston ports including a pressure port and a piston port connected by the inner fluid vane.

In accordance with one or more embodiments or any of the above pumping system embodiments, the plurality of piston ports can include a second pressure port connected to the piston port by the inner fluid vane.

In accordance with one or more embodiments or any of the above pumping system embodiments, the piston assembly can include a second inner fluid vane, the plurality of piston ports including a second pressure port and a second piston port connected by the second inner fluid vane.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

In accordance with one or more embodiments, a variable displacement pumping system and/or a valve-less variable displacement pump assembly (herein referred to as a pumping system and/or a pump assembly) is provided. The pump includes a stator assembly and a piston assembly. The stator assembly includes a rotary winding, a linear winding, and stator ports. The piston assembly is positioned within the stator assembly. The linear winding translates the piston assembly along a lengthwise axis of the stator assembly. The rotary winding rotates the piston assembly about the lengthwise axis of the stator assembly.

The technical effects and benefits of the pump assembly described herein include eliminating moving parts to increase an overall system reliability, while increasing compactness, and providing a displacement with an infinite variable and metering accuracy a highly accurate, reliable, and compact highly compact and. limited by the commutation sensors.

Figure 1:
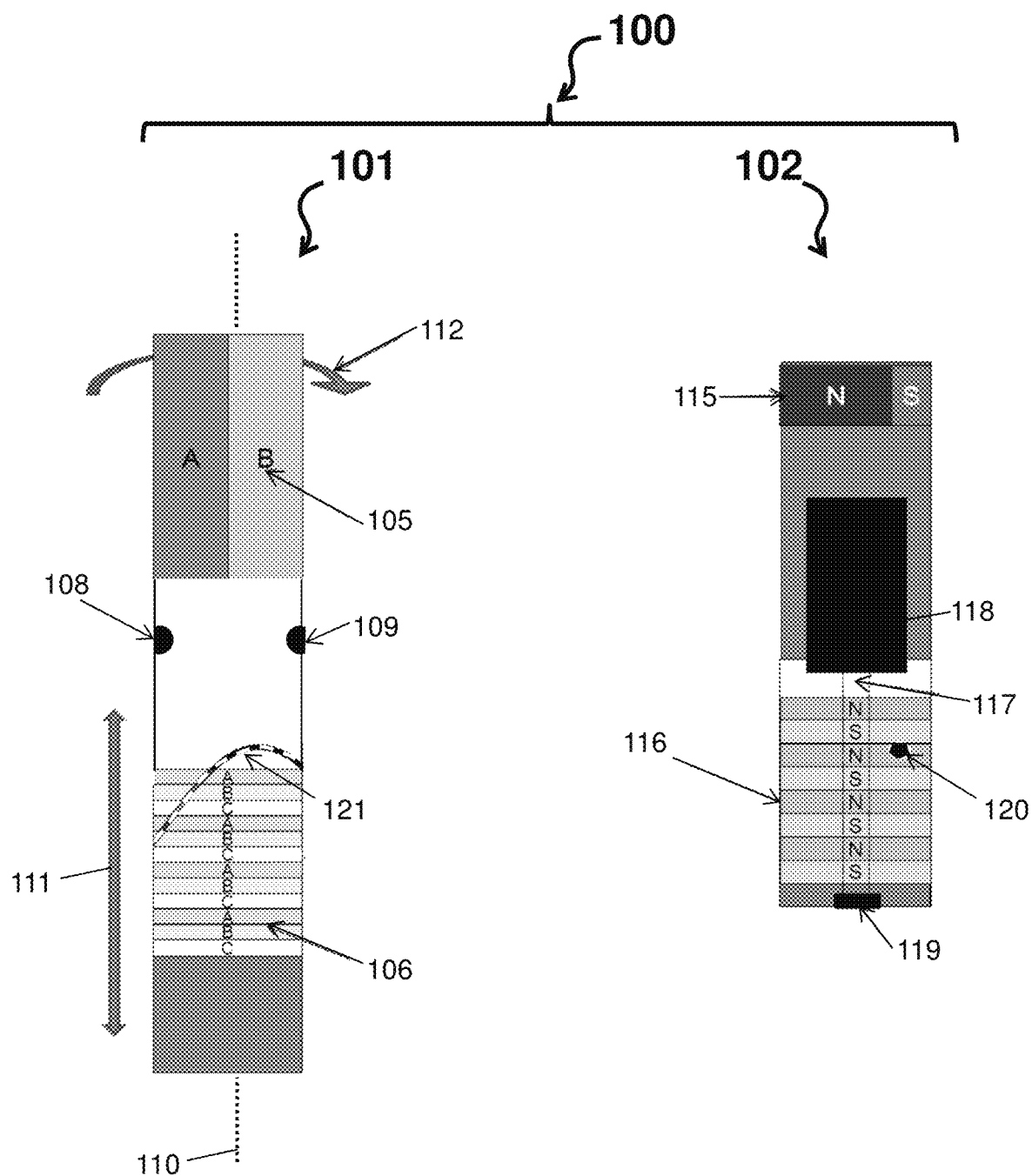
FIG. 1 depicts a pump assembly according to one or more embodiments.

FIG. 1 depicts a pump assembly 100 according to one or more embodiments. The pump assembly 100 includes a stator assembly 101 and a piston assembly 102. While shown separate for ease of explanation, the piston assembly 102 can be positioned within the stator assembly 101. The pump assembly 100 is an example and is not intended to suggest any limitation as to the scope of use or operability of embodiments described herein (indeed additional or alternative components and/or implementations may be used). Further, while single items are illustrated for items of the pump assembly 100, these representations are not intended to be limiting and thus, any item may represent a plurality of items.

The stator assembly 101 includes a rotary winding 105, a linear winding 106, and a plurality of stator ports. The plurality of stator ports can comprise at least an inlet stator port 108 and an outlet stator port 109. The linear winding 106 translates the piston assembly 102 along a lengthwise axis 110 of the stator assembly 101 (e.g., provides a linear stroke 111). The rotary winding 105 rotates the piston assembly 102 about the lengthwise axis 110 of the stator assembly 101 (e.g., provides a clockwise and/or counter-clockwise rotation 112).

The piston assembly 102 includes a rotary armature 115 and a linear armature 116, along with an inner fluid vane 117 and a plurality of piston ports. The plurality of piston ports can include a pressure port 118 and a piston port 119 connected by the inner fluid vane 117.

Figure 2:
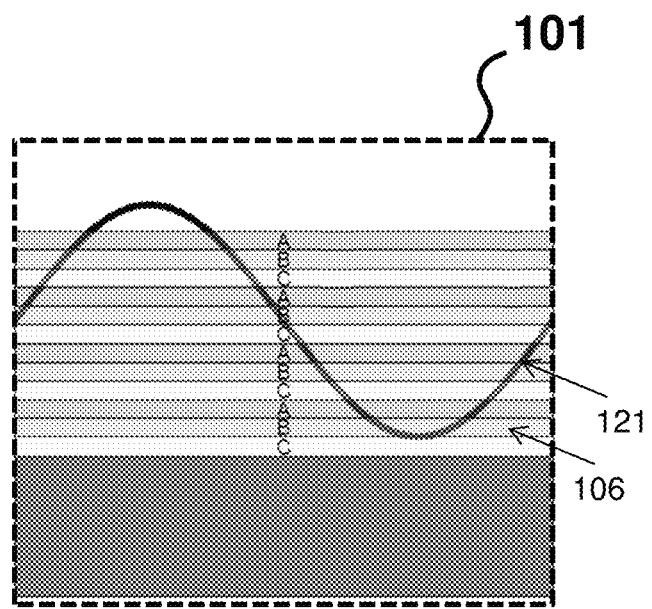
FIG. 2 depicts an unrolled pump assembly according to one or more embodiments.

In accordance with one or more embodiments, the pump assembly 100 provides rotation and/or translation rod action. For instance, the plurality of piston ports of the piston assembly 102, when properly commutated, can pump a working fluid from the inlet stator port 108 to the outlet stator port 109 incorporated into the stator assembly 101. The stator assembly 101 acts as a piston cylinder and has at least a dual set of windings (e.g., the rotary winding 105 and the linear winding 106) that interact with the piston magnets (e.g., the rotary armature 115 and the linear armature 116) to create a pumping motion. By way of example and to assist with understanding the pumping motion, FIG. 1 includes a demarcation point 120 that is fixed arbitrarily to the piston assembly 102. In turn, as the piston assembly 102 translates and rotates, the demarcation point 120 follows a pattern 121 within the stator assembly 101. In accordance with one or more embodiments, FIG. 2 further depicts the pump assembly 100 unrolled to illustrate the pattern 121 (e.g., sinusoidal as shown) of the demarcation point 120 within the stator assembly 101.

Figure 3:
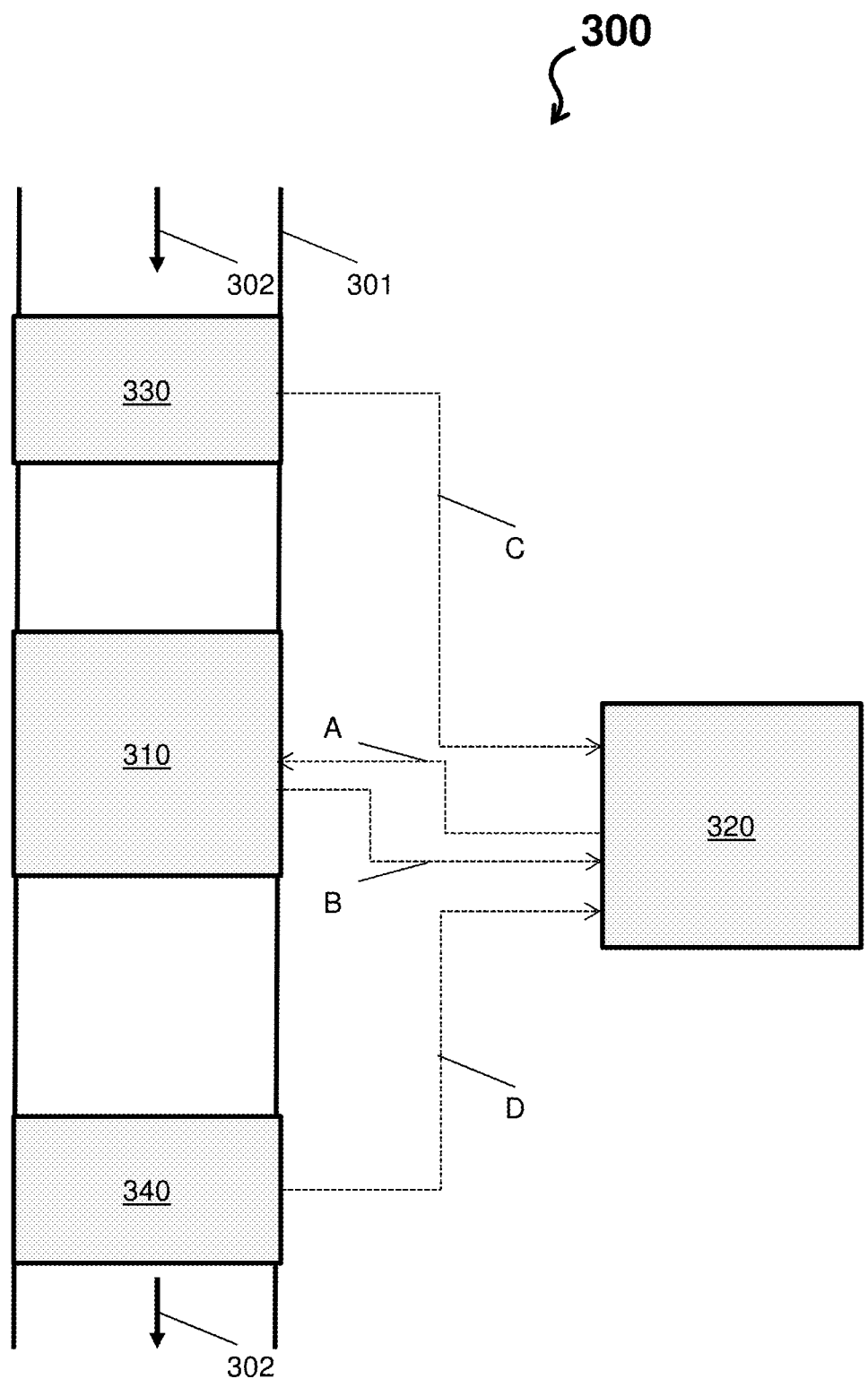
FIG. 3 depicts a pump system according to one or more embodiments.

FIG. 3 depicts a pump system 300 according to one or more embodiments. The pump system 300 comprises a conduit 301, a fluid 302, a pump assembly 310 (e.g., a pump assembly 100 of FIG. 1), a controller 320, and one or more sensors, such as an input sensor 330 and an output sensor 340 as shown. The conduit 301 is channel for conveying the fluid 302, and can be made of metal, plastic, fiber, fired clay, etc. The fluid 302 can be any liquid or gas capable of being pumped from one volume to another. The pump assembly 310 (e.g., a pump assembly 100 of FIG. 1), the controller 320, and the one or more sensors can be electrically coupled to communicate electrical signals there between.

The controller 320 comprises a processor, a memory, and/or any processing hardware, software, or combination of hardware and software utilized by the pumping system 300 to carry out computer readable program instructions by performing arithmetical, logical, and/or input/output operations. The processor can comprise one or more central processing units (CPU(s)), also referred to as processing circuits, coupled via a system bus to the memory and various other internal or external components (e.g., the one or more sensors). The memory can include a read only memory (ROM) and a random access memory (RAM).

The one or more sensors can be an electro-mechanical component that detects events in the conduit 301 and generates an electrical signal as a function of the events (e.g., generates an electrical signal in response to detecting a state of the fluid 302). The one or more sensors can utilize software and/or firmware to carry out operations particular thereto.

In an example operation, the pump assembly 310, as controlled by the controller 320 (as shown by arrow A), causes the fluid 302 to flow through the conduit 301. The components of the pump assembly 310, along with the input sensor 330 and the output sensor 340, can provide feedback information (as shown by arrows B, C, and D) to the controller 320 so that the controller 320 can adjust the operation of the pump assembly 310.

Figure 4:
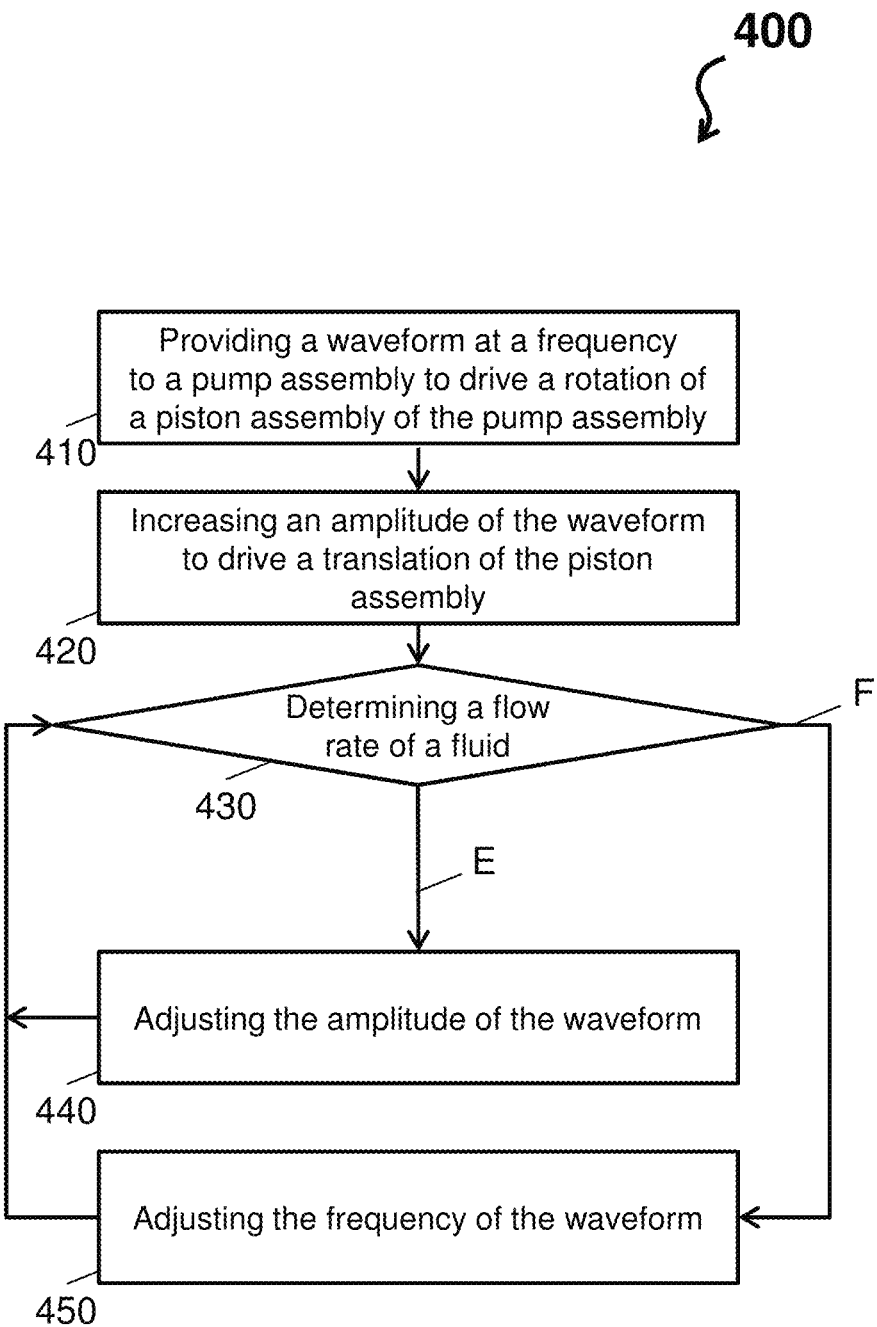
FIG. 4 depicts a process flow of a pump system according to one or more embodiments.

FIG. 4 depicts a process flow 400 of the pumping system 300 according to one or more embodiments. The process flow 400 begins at block 410, where the controller 320 provides a waveform at a frequency to a pump assembly 310 to drive a rotation of a piston assembly of the pump assembly 310. The waveform can be any waveform, such as square, sinusoidal, etc., where the frequency corresponds to a rotational speed and an amplitude corresponds to a translation of the piston assembly.

At block 410, the controller 320 increases an amplitude of the waveform to drive a translation of the piston assembly. The increase can be gradual to corresponding engage a pump action of the fluid 302 from zero to maximum.

At block 430, the controller 320 determines a flow rate of the fluid 302. The flow rate can be determined by the controller 320 based on the waveform itself and/or feedback information received by the one or more sensors. If the flow rate is not a desired value, the controller can alter the waveform. For instance, the process flow 400 can proceed to block 440 (via arrow E), where the controller 320 can adjust (increase or decrease) the amplitude. Further, the process flow 400 can proceed to block 450 (via arrow F), where the controller 320 can adjust (increase or decrease) the frequency. The process flow 400 can then return to decision block 430.

Figure 5:
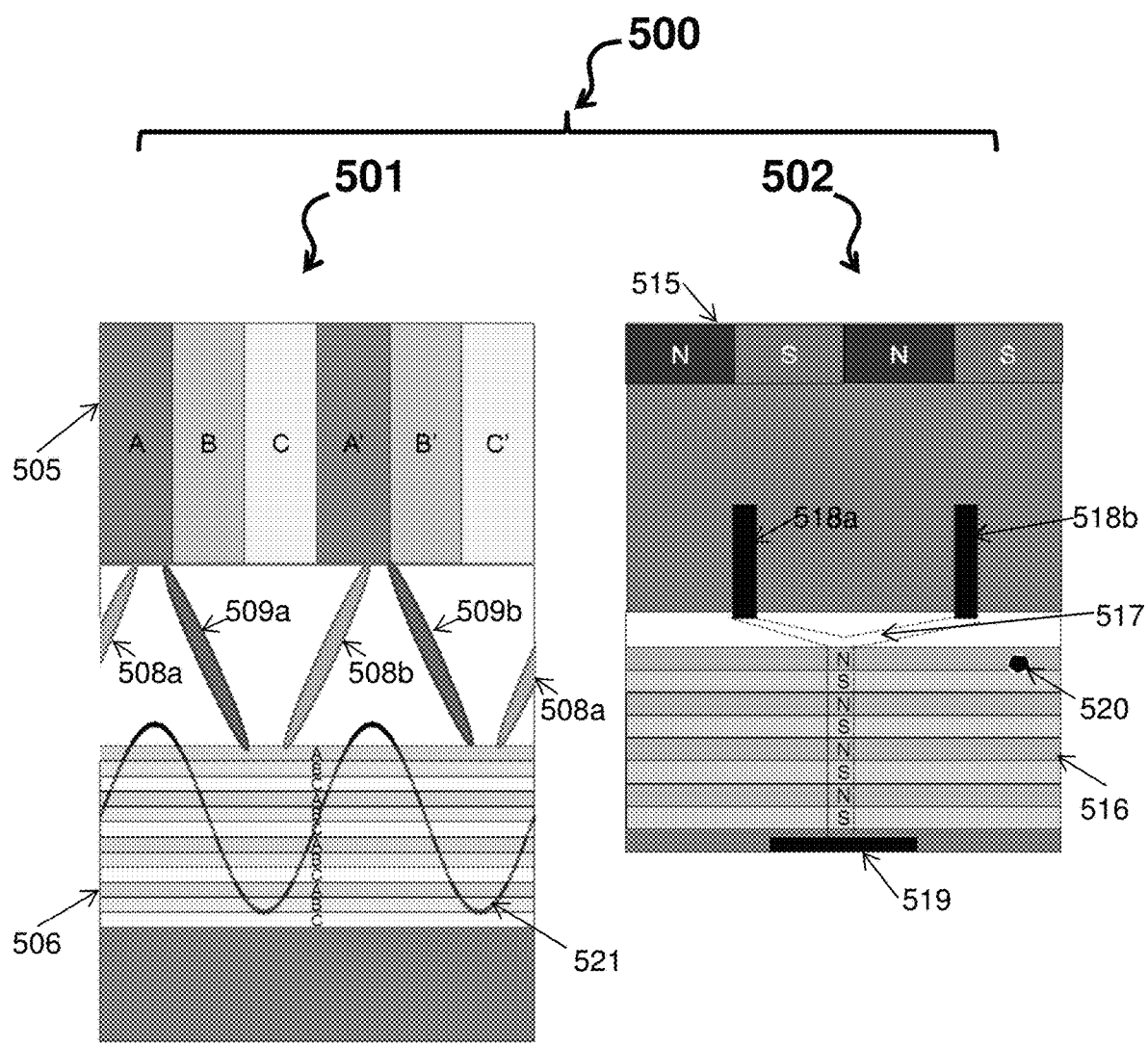
FIG. 5 depicts a pump assembly with two ports according to one or more embodiments.
Figure 6:
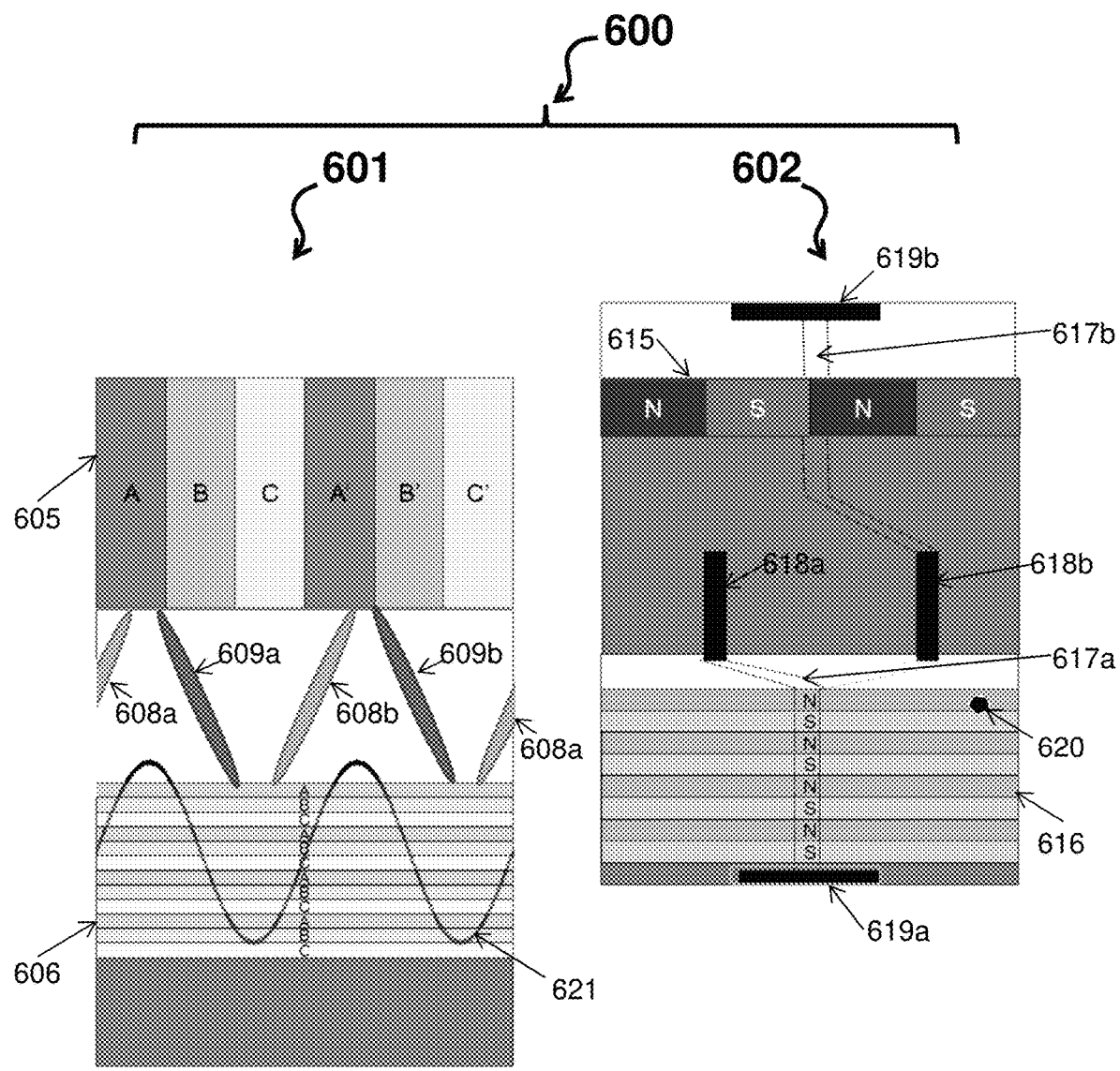
FIG. 6 depicts a pump assembly with dual sides according to one or more embodiments.

Turning now to FIGS. 5-6, the pumping system will now be further described according to one or more embodiments. FIG. 5 depicts a pump assembly 500 with two ports according. The pump assembly 500 includes a stator assembly 501 and a piston assembly 502. While shown separate for ease of explanation, the piston assembly 502 can be positioned within the stator assembly 501. The pump assembly 500 is an example and is not intended to suggest any limitation as to the scope of use or operability of embodiments described herein (indeed additional or alternative components and/or implementations may be used). Further, while single items are illustrated for items of the pump assembly 500, these representations are not intended to be limiting and thus, any item may represent a plurality of items.

The stator assembly 501 includes a rotary winding 505, a linear winding 506, and a plurality of stator ports. The plurality of stator ports can comprise at least an inlet stator port 508a, an inlet stator port 508b, an outlet stator port 509a, and an outlet stator port 509b. The linear winding 506 translates the piston assembly 502 along a lengthwise axis of the stator assembly 501 (e.g., provides a linear stroke). The rotary winding 505 rotates the piston assembly 502 about the lengthwise axis of the stator assembly 501 (e.g., provides a clockwise and/or counterclockwise rotation).

The piston assembly 502 includes a rotary armature 515 and a linear armature 516, along with an inner fluid vane 517 and a plurality of piston ports. The plurality of piston ports can include pressure ports 518a, 518b and a piston port 519 connected by the inner fluid vane 517.

In accordance with one or more embodiments, the pump assembly 500 provides rotation and/or translation rod action. For instance, the plurality of piston ports of the piston assembly 502, when properly commutated, can pump a working fluid from the inlet stator ports 508a, 508b to the outlet stator ports 509a, 509b incorporated into the stator assembly 501. The stator assembly 501 acts as a piston cylinder and has at least a dual set of windings (e.g., the rotary winding 505 and the linear winding 506) that interact with the piston magnets (e.g., the rotary armature 515 and the linear armature 516) to create a pumping motion. By way of example and to assist with understanding the pumping motion, FIG. 5 includes a demarcation point 520 that is fixed arbitrarily to the piston assembly 502. In turn, as the piston assembly 502 translates and rotates, the demarcation point 520 follows a pattern 521 within the stator assembly 501. In accordance with one or more embodiments, FIG. 5 further depicts the stator assembly 501 unrolled to illustrate the pattern 521 (e.g., sinusoidal as shown) of the demarcation point 520.

FIG. 6 depicts a pump assembly with dual sides according to one or more embodiments. The pump assembly 600 includes a stator assembly 601 and a piston assembly 602. While shown separate for ease of explanation, the piston assembly 602 can be positioned within the stator assembly 601. The pump assembly 600 is an example and is not intended to suggest any limitation as to the scope of use or operability of embodiments described herein (indeed additional or alternative components and/or implementations may be used). Further, while single items are illustrated for items of the pump assembly 600, these representations are not intended to be limiting and thus, any item may represent a plurality of items.

The stator assembly 601 includes a rotary winding 605, a linear winding 606, and a plurality of stator ports. The plurality of stator ports can comprise at least an inlet stator port 608a, an inlet stator port 608b, an outlet stator port 609a, and an outlet stator port 609b. The linear winding 606 translates the piston assembly 602 along a lengthwise axis of the stator assembly 601 (e.g., provides a linear stroke). The rotary winding 605 rotates the piston assembly 602 about the lengthwise axis of the stator assembly 601 (e.g., provides a clockwise and/or counterclockwise rotation).

The piston assembly 602 includes a rotary armature 615 and a linear armature 616, along with an inner fluid vanes 617a, an inner fluid vanes 617b, and a plurality of piston ports. The plurality of piston ports can include pressure ports 618a, 618b and piston ports 619a, 619b connected by the inner fluid vanes 617a, 617b, respectively.

In accordance with one or more embodiments, the pump assembly 600 provides rotation and/or translation rod action. For instance, the plurality of piston ports of the piston assembly 602, when properly commutated, can pump a working fluid from the inlet stator ports 608a, 608b to the outlet stator ports 609a, 609b incorporated into the stator assembly 601. The stator assembly 601 acts as a piston cylinder and has at least a dual set of windings (e.g., the rotary winding 605 and the linear winding 606) that interact with the piston magnets (e.g., the rotary armature 615 and the linear armature 616) to create a duel pumping motion. By way of example and to assist with understanding the pumping motion, FIG. 6 includes a demarcation point 620 that is fixed arbitrarily to the piston assembly 602. In turn, as the piston assembly 602 translates and rotates, the demarcation point 620 follows a pattern 621 within the stator assembly 601. In accordance with one or more embodiments, FIG. 6 further depicts the stator assembly 601 unrolled to illustrate the pattern 621 (e.g., sinusoidal as shown) of the demarcation point 620.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A pump assembly comprising:
a stator assembly comprising a rotary winding and a linear winding, wherein the stator assembly comprises a plurality of stator ports, the plurality of stator ports comprising an inlet stator port and an outlet stator port between the rotary winding and the linear winding; and
a piston assembly positioned within the stator assembly; and
wherein the piston assembly translates along a lengthwise axis of the stator assembly and rotates about the lengthwise axis of the stator assembly to create a pumping action, and the piston assembly comprises a plurality of piston ports and an inner fluid vane, the plurality of piston ports comprising a pressure port and a piston port connected by the inner fluid vane.

2. The pump assembly of claim 1, wherein the piston assembly comprises a linear armature and a rotary armature.

3. The pump assembly of claim 2, wherein the stator assembly acts as a piston cylinder within which the piston assembly translates in accordance with the linear winding interacting with the linear armature and rotates in accordance with the rotary winding interacting with the rotary armature to create the pumping action.

4. The pump assembly of claim 1, wherein the pumping action pumps a working fluid from the inlet stator port to the outlet stator port as the piston assembly translates and rotates within the stator assembly.

5. The pump assembly of claim 1, wherein the plurality of piston ports comprises a second pressure port connected to a second piston port by a second inner fluid vane.

6. The pump assembly of claim 1, wherein the plurality of piston ports comprises a second pressure port and the piston port is connected to the second pressure port by the inner fluid vane.

7. The pump assembly of claim 1, wherein the pump assembly is electrically coupled to a controller, and
wherein the pump assembly receives a waveform that drives the rotary winding and the linear winding.

8. The pump assembly of claim 7, wherein an amplitude of the waveform drives the translation of the piston assembly.

9. The pump assembly of claim 7, wherein a frequency of the waveform drives the rotation of the piston assembly.

10. A pumping system comprising:
a pump assembly comprising a stator assembly and a piston assembly, the stator assembly comprising a rotary winding and a linear winding, the stator assembly comprising a plurality of stator ports, the plurality of stator ports comprising an inlet stator port and an outlet stator port between the rotary winding and the linear winding, and the piston assembly being positioned within the stator assembly; and
a controller electrically coupled to the pump assembly to provide a waveform that drives the rotary winding and the linear winding, wherein the piston assembly comprises a plurality of piston ports and an inner fluid vane, the plurality of piston ports comprising a pressure port and a piston port connected by the inner fluid vane.

11. The pump system of claim 10, wherein the piston assembly translates along a lengthwise axis of the stator assembly and rotates about the lengthwise axis of the stator assembly to create a pumping action.

12. The pump system of claim 10, wherein the piston assembly comprises a linear armature and a rotary armature.

13. The pump system of claim 12, wherein the stator assembly acts as a piston cylinder within which the piston assembly translates in accordance with the linear winding interacting with the linear armature and rotates in accordance with the rotary winding interacting with the rotary armature to create the pumping action.

14. The pump system of claim 10, wherein the pumping action pumps a working fluid from the inlet stator port to the outlet stator port as the piston assembly translates and rotates within the stator assembly.

15. The pump system of claim 10, wherein the plurality of piston ports comprises a second pressure port connected to a second piston port by a second inner fluid vane.

16. The pump system of claim 10, wherein the plurality of piston ports comprises a second pressure port and the piston port is connected to the second pressure port by the inner fluid vane.

* * * * *